United States Patent
Kuo

(10) Patent No.: US 8,000,021 B2
(45) Date of Patent: Aug. 16, 2011

(54) LENS MANUFACTURING APPARATUS AND LENS MANUFACTURED THEREBY

(75) Inventor: Yuan-Lung Kuo, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 12/749,479

(22) Filed: Mar. 29, 2010

(65) Prior Publication Data

US 2011/0128631 A1    Jun. 2, 2011

(30) Foreign Application Priority Data

Nov. 30, 2009    (CN) .......................... 2009 1 0310612

(51) Int. Cl.
| | |
|---|---|
| *G02B 11/00* | (2006.01) |
| *G02B 13/00* | (2006.01) |
| *G02B 15/00* | (2006.01) |
| *G02B 17/00* | (2006.01) |
| *G02B 25/00* | (2006.01) |
| *G02B 3/00* | (2006.01) |
| *G02B 7/00* | (2006.01) |
| *G02B 9/00* | (2006.01) |

(52) U.S. Cl. ....................................................... 359/642
(58) Field of Classification Search .......... 359/619–626, 359/642
See application file for complete search history.

(56) References Cited

U.S. PATENT DOCUMENTS

2005/0013004 A1* 1/2005 Miyakoshi et al. ........... 359/619

\* cited by examiner

*Primary Examiner* — Alicia M Harrington
(74) *Attorney, Agent, or Firm* — Raymond J. Chew

(57) ABSTRACT

A lens manufacturing apparatus includes a first mold, a second mold, a first core, and a second core. The first mold defines a first compartment therein. The second mold defines a second compartment therein. The first core is inserted into the first compartment of the first mold, and includes a first mold surface with a first half-mold cavity and a conic ring surrounding the first half mold cavity. The second core is inserted into the second compartment of the second mold, and includes a second mold surface with a second half-mold cavity. The second half-mold cavity includes a bottom which connects to the periphery of the second mold surface by an acclivitous surface. The acclivitous surface is parallel with the outermost conic surface of the conic ring.

9 Claims, 2 Drawing Sheets

LENS MANUFACTURING APPARATUS AND LENS MANUFACTURED THEREBY

BACKGROUND

1. Technical Field

The disclosure relates to a lens manufacturing apparatus and a lens manufactured thereby.

2. Description of Related Art

Injection molding method is currently one of the best choice for mass production of lenses. Molten material is injected into a mold cavity of a mold apparatus under a high pressure. When the molding cavity is full, the cooled down and solidified molten material is shaped to produce a lens. Generally, a lens includes at least one convex or concave surface for converging or diverging transmitted light, which gives the lens a cross-sectional thickness varying from the periphery to the center. The varied cross-sectional thickness means that the molten molding material in the mold cavity is cooled down at different rates, where the thinnest parts are cooled before the thickest parts; as a result, this causes "sinks" in the lens, which produce molded-in stress that make the lens quite brittle.

Therefore, it is desirable to provide a lens manufacturing apparatus that can overcome the above problems, and a lens manufactured thereby.

DETAILED DESCRIPTION

Figure 1:
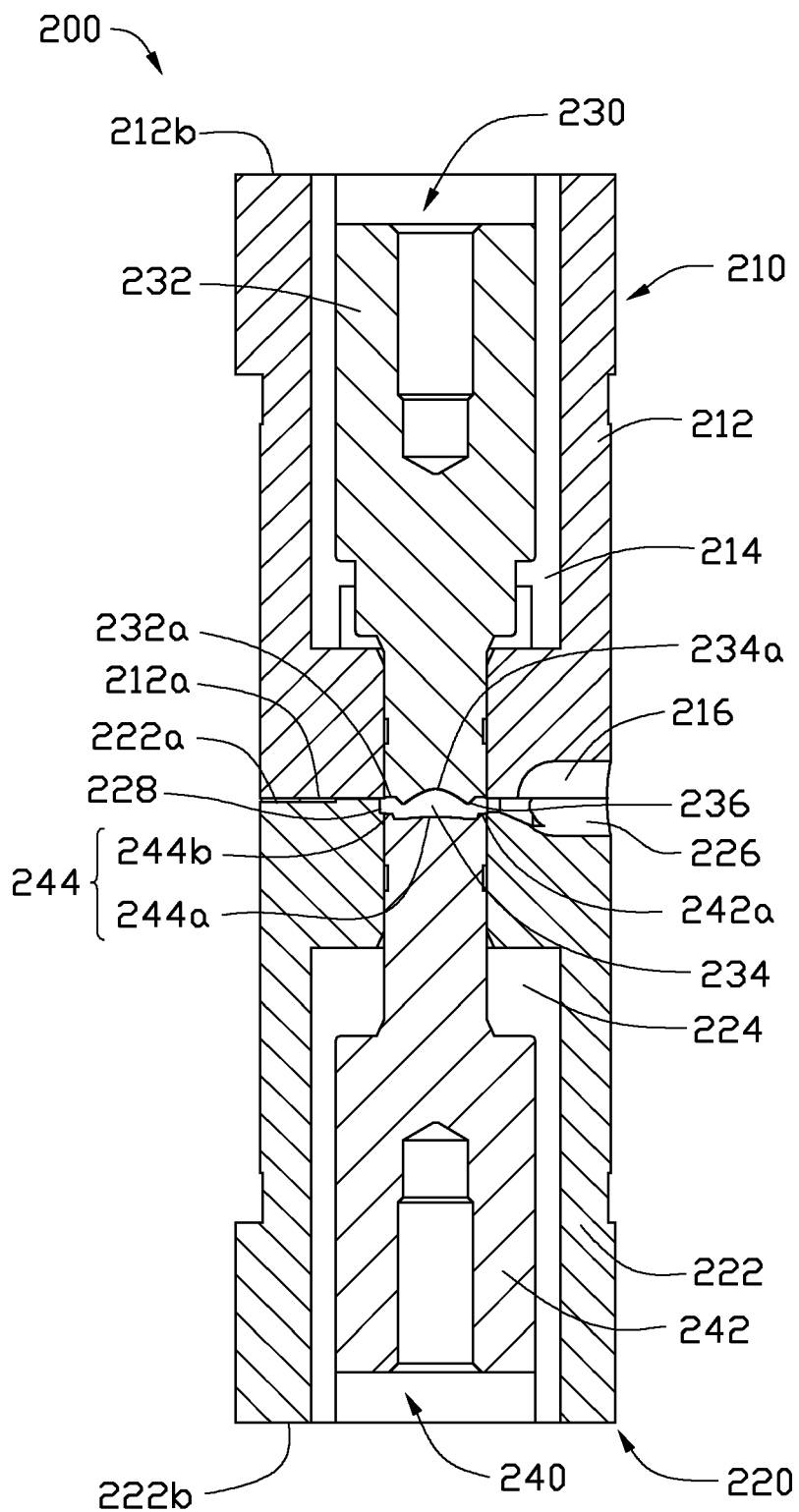
FIG. 1 is a cross-sectional schematic view of a lens manufacturing apparatus in accordance with an embodiment.

Referring to FIG. 1, a lens manufacturing apparatus 200 according to one exemplary embodiment includes a first mold 210, a second mold 220, a first core 230 and a second core 240.

The first mold 210 includes a first cylindrical body 212 having a first parting surface 212a and an opposite first end surface 212b. The first body 212 defines a first compartment 214 spanning from the first parting surface 212a to the first end surface 212b, for receiving the first core 230. A first half sprue 216 defines in the first parting surface 212a.

The second mold 220 includes a second cylindrical body 222 having a second parting surface 222a, and an opposite second end surface 222b. The second body 222 defines a second compartment 224 spanning from the second parting surface 222a to the second end surface 222b, for receiving the second core 240. A second half sprue 226 is defined in the second parting surface 222 for forming a whole sprue together with the first half sprue 216, through which the molten material is channeled into a mold cavity. The second parting surface 222a further defines an annular cutout 228 communicating with the second half sprue 226 around the second compartment 224.

The first core 230 includes a first base 232 received in the first compartment 214 of the first mold 210. The first base 232 includes a first mold surface 232a on which a first half-mold cavity 234 and a conic ring 236 surrounding the first half-mold cavity 234 are formed. The bottom 234a of the first half-mold cavity 234 is either aspherical or spherical whichever has a shorter radius of curvature.

The second core 240 includes a second base 242 received in the second compartment 224 of the second mold 220. The second base 242 includes a second mold surface 242a in which a second half-mold cavity 244 forms. The bottom 244a of the second half-mold cavity 244 is as substantially flat as a horizontal plane by having a substantially large radius of curvature. The bottom 244a connects to the periphery of the second mold surface 242a by an acclivitous surface 244b. The acclivitous surface 244b is approximately parallel with the outermost conic surface of the conic ring 236.

In assembly, the first and second cores 230 and 240 insert into the first and second compartments 214 and 224 correspondingly. The first and second parting surfaces 212a and 222a contact, and the first and second cores 230 and 240 align with each other. The first mold surface 232a is slightly lower than the first parting surface 212a of the first mold 210 as viewed when the first mold 210 is detached and held upside down, while the second mold surface 242a is coplanar with the bottom of the cutout 228. A mold cavity forms between the first and second mold surfaces 232a and 242a where molten material molds to a predefined shape. The depth at the periphery of the mold cavity changes little and is approximately constant, and is of slight difference as compared with the depth at the center of the mold cavity, as such to reduce the molded-in stress, and thereby equalizing the cooling rates of the molded material in the mold cavity.

Figure 2:
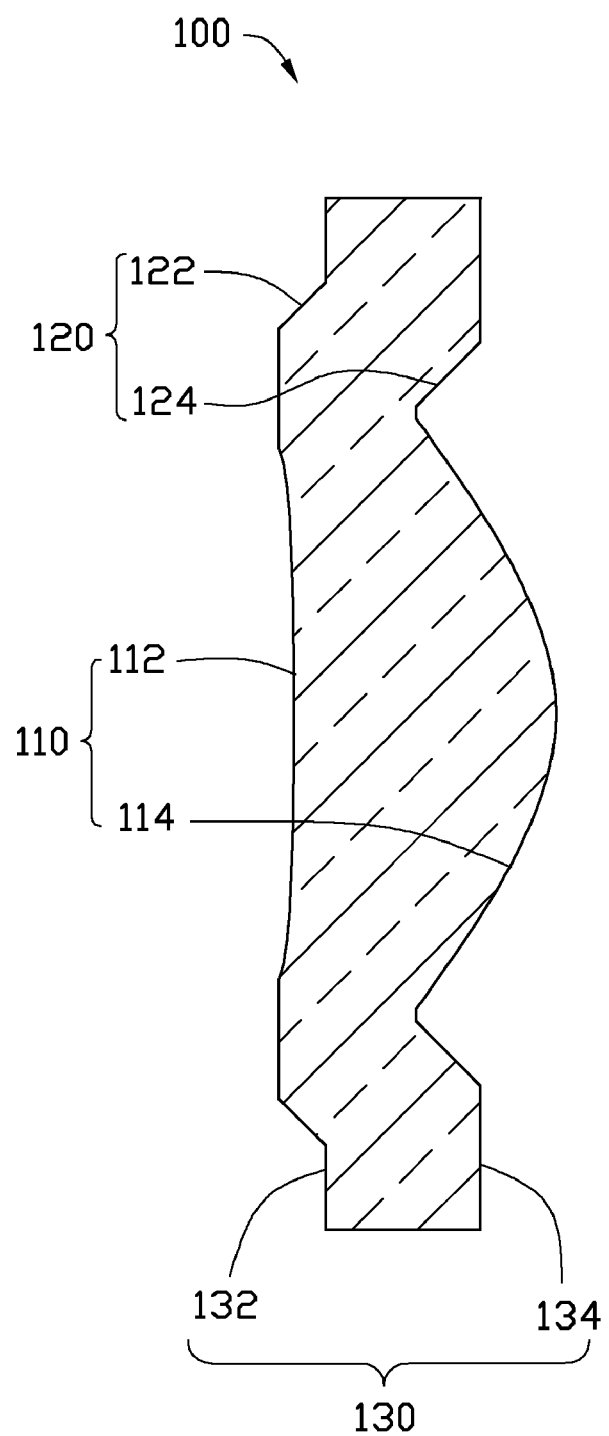
FIG. 2 is a cross-sectional schematic view of a lens manufactured by the lens manufacturing apparatus of FIG. 1.

Referring to FIG. 2, a lens 100 manufactured by the lens manufacturing apparatus 200 is shown. The lens 100 includes a circular center portion 110, an annular middle portion 120, and an annular outer portion 130 interconnected to the center portion 110 by the middle portion 120.

The center portion 110 includes a first surface 112 and an opposite second surface 114 coaxial with the first surface 112. The first surface 112 has a center portion with a larger radius of curvature and an acclivitous periphery surrounding the center portion. The second surface 114 is convex relative to the periphery thereof and has a shorter radius of curvature compared with the center portion of the first surface 112. The second surface 114 is designed to be either aspheric or spherical according to different situations or needs. The outer radius of the first surface 112 is larger than that of the second surface 114.

The middle portion 120 surrounds the center portion 110. The middle portion 120 slopes radially outwardly from the periphery of the center portion 110. The middle portion 120 includes a third surface 122 connected to the first surface 112 of the center portion 110, and an opposite fourth surface 124 connected to the second surface 114 of the center portion 110 in parallel.

The outer portion 130 surrounds the middle portion 120, and includes a fifth surface 132 connected to the third surface 122 and an opposite sixth surface 134 connected to the fourth surface 124 in parallel. The fifth and six surfaces 132 and 134 are both approximately parallel to the first and second surfaces 112 and 114. The thickness of the middle portion 120, i.e., the distance from the third surface 122 to the fourth surface 124, is equal to the thickness of the outer portion 130, i.e., the distance from the fifth surface 132 to the sixth surface 134.

The lens 100 in the present disclosure has a middle portion 120 that smoothes the interconnection between the center portion 110 and the outer portion 130, as such, in the molding process, the molten material can thereby easily flow into the center portion of the mold cavity to form the lens with little molded-in stress and without a "sink" problem.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A lens manufacturing apparatus comprising:
   a first mold comprising a first body having a first parting surface and an opposite first end surface, and a first compartment spanning from the first parting surface to the first end surface; the first parting surface defining a first half sprue;
   a second mold comprising a second body having a second parting surface and an opposite second end surface, and a second compartment spanning from the second parting surface to the second end surface; the second parting surface defining a second half sprue corresponding to the first half sprue of the first mold, and the second parting surface contacted to the first parting surface of the first mold to align with the first mold;
   a first core inserted into the first compartment of the first mold, and comprising a first mold surface formed with a first half-mold cavity and a conic ring surrounding the first half-mold cavity; the first mold surface is lower than the first parting surface of the first mold; and
   a second core inserted into the second compartment of the second mold, and comprising a second mold surface formed with a second half-mold cavity, wherein the bottom of the second half-mold cavity is connected to the periphery of the second mold surface by an acclivitous surface, and the acclivitous surface is parallel to the outermost conic surface of conic ring.

2. The lens manufacturing apparatus of claim 1, wherein the second mold defines an annular cutout in the second parting surface around the second compartment and communicating with the second half sprue.

3. The lens manufacturing apparatus of claim 2, wherein the second mold surface of the second core is coplanar with the bottom of the cutout of the second mold.

4. The lens manufacturing apparatus of claim 3, wherein the first and the second mold surfaces cooperatively define a mold cavity having gradually changed depth at the periphery of the mold cavity.

5. A lens manufactured by the lens manufacturing apparatus of claim 1 comprising:
   a center portion comprising a first surface and an opposite second surface coaxial with the first surface;
   a middle portion surrounding the center portion and sloping radially outwards from the periphery of the center portion, and comprising a third surface connected to the first surface of the center portion, and an opposite fourth surface connected to the second surface of the center portion in parallel; and
   an outer portion surrounding the middle portion and comprising a fifth surface connected to the third surface and an opposite sixth surface connected to the fourth surface in parallel; wherein the thicknesses of the middle portion and the outer portion are equal.

6. The lens of claim 5, wherein the second surface is convex relative to the periphery thereof and having a shorter radius of curvature comparing with the center portion of the first surface.

7. The lens of claim 6, wherein the second surface is designed as either aspheric or spherical.

8. The lens of claim 7, wherein the outer radius of the first surface is larger than that of the second surface.

9. The lens of claim 8, wherein the bottom of the first half-mold cavity is designed to be either aspheric or spherical.

* * * * *